United States Patent [19]

Panster et al.

[11] Patent Number: 4,772,457

[45] Date of Patent: Sep. 20, 1988

[54] PREPARING TITANIUM DISULFIDE FOR USE IN BATTERIES

[75] Inventors: Peter Panster, Rodenbach; Rudolf Mueller, Freigericht; Peter Kleinschmit, Hanau, all of Fed. Rep. of Germany

[73] Assignee: Degussa Aktiengesellschaft, Frankfurt, Fed. Rep. of Germany

[21] Appl. No.: 884,170

[22] Filed: Jul. 10, 1986

[30] Foreign Application Priority Data

Jul. 17, 1985 [DE] Fed. Rep. of Germany ....... 3525475

[51] Int. Cl.$^4$ .............................................. C01B 17/00
[52] U.S. Cl. .......................... 423/561 R; 423/658.5; 423/578 R; 423/567 A; 429/218
[58] Field of Search ............... 423/565, 578 A, 578 R, 423/561 R, 567 A, 658.5; 23/293 S; 429/218; 252/182.1

[56] References Cited

U.S. PATENT DOCUMENTS

| | | | |
|---|---|---|---|
| 2,316,673 | 4/1943 | McDonald | 423/578 |
| 2,785,059 | 3/1957 | McDonald | 423/567 |
| 3,803,288 | 4/1974 | Kudryk et al. | 423/561 R |
| 4,007,055 | 2/1977 | Wittingham | 429/218 |
| 4,307,157 | 12/1981 | Joshi et al. | 429/218 |
| 4,343,714 | 8/1982 | Joshi et al. | 429/218 |

*Primary Examiner*—John F. Niebling
*Assistant Examiner*—Steven P. Marquis
*Attorney, Agent, or Firm*—Beveridge, DeGrandi & Weilacher

[57] ABSTRACT

A process for preparing titanium disulfide for use as electrode material in batteries. The starting material to be purified has an approximate composition corresponding to $TiS_2$, a content of free sulfur greater than 0.1 weight % and/or a particle diameter $d_{90\%}$ greater than 10 $\mu$m and is dispersed in an organic liquid that dissolves sulfur but not $TiS_2$ in a shearing device, is then separated from the liquid phase, washed, and dried with exclusion of air.

11 Claims, No Drawings

PREPARING TITANIUM DISULFIDE FOR USE IN BATTERIES

The present invention relates to a process by which titanium disulfide raw material from different sources can be prepared so that it ideally satisfies the physical and chemical criteria established for use as cathode material in alkali metal/TiS$_2$ batteries, especially Li-/TiS$_2$ batteries.

For several years now, rechargeable batteries with an anode of elemental alkali metal, lithium being especially preferred for this purpose, and a cathode of titanium disulfide have attracted interest in battery research. The advantages of this system, which is based on the reaction:

$$Li + TiS_2 \rightleftharpoons LiTiS_2 \qquad (2)$$

include, among others, reversibility lasting for many years, high energy density, high free energy of formation, usability at room temperature, and the fact that no structural changes occur in the electrode system.

Possible applications and forms of application for this type of battery are, for example, round cells for the microelectronic industry, which can also be recharged by solar energy, as well as in large batteries for electric automobiles and emergency power facilities (cf., for example, German OLS 24 42 411; German OLS 28 17 702; German OLS 28 17 708; U.S. Pat. No. 4,091,191; M. S. Whittingham in "Science", Vol. 192, page 1126; M. S. Whittingham in Prog. Solid State Chem., Vol. 12, page 41).

The energy supplying process occurring in the discharge of the Li/TiS$_2$ battery can be described as the insertion of Li$^+$ ions from the Li anode into the hexagonal layer lattice of titanium disulfide with the formation of LiTiS$_2$, a so-called intercalation compound. This process is reversed when the battery is recharged. Certain chemical and physical criteria must be met with regard to the titanium disulfide employed as cathode material to ensure as high a number of discharge/recharge cycles as possible with the attainment of as constant and as high as possible a performance of the Li-/TiS$_2$ battery system. These criteria have been described in great detail by G. F. Everson in the book "Speciality Inorganic Chemicals," edited by R. Thompson Special Publication No. 40, The Royal Society of Chemistry, Burlington House, London, pages 235-236.

According to this publication, titanium disulfide, employed as cathode material in batteries, should, among other things, possess the following physical and chemical specifications:

1. The particle size should be rather small. For example, one should strive for a particle size distribution of between 1 and 25 μm, preferably 10μm. A small particle size enables a better control over the porosity of the electrode.

2. The particle crystals should have a ratio as small as possible of the lengths of the horizontal axis to the vertical axis, so that the diffusion of the lithium atoms, which occurs parallel to the horizontal plane, is promoted This is then expressed in higher charge/discharge rates.

3. The chlorine content of the titanium disulfide should be as low as possible, because chlorine reacts with the alkali metal anode, which reduces system reversibility.

4. The free sulfur content of the titanium disulfide should be as low as possible, because sulfur likewise reacts with the alkali metal anode and, in addition, reduces the achievable energy density of the battery.

5. The chemical composition of titanium disulfide should correspond to the formula Ti$_x$S$_2$, in which, in the ideal case, x is equal to 1 or is at most 1.05.

6. The so-called Seebeck coefficient of titanium disulfide should be in the range of 130-150 μV/K. This is the thermoelectric power measured between two copper blocks, which exhibit a temperature difference of 10°-15° C. and between which a TiS$_2$ pressed article is suspended.

Titanium disulfide can be prepared by a variety of processes. On the one hand, it can be synthesized from the elements titanium and sulfur (cf., for example, U.S. Pat. No. 3,079,229, German OLS 26 52 908) or, on the other hand, from a titanium compound and a sulfurization component (cf., for example, German OLS 12 24 288; British Pat. No. 878,101; German Pat. No. 26 52 092; U.S. Pat. No. 4,137,297; U.S. Pat. No. 3,979,500; German OLS 29 45 306).

However, from the point of view of technical feasibility and economy only a basic process concept whereby titanium tetrachloride is reacted with hydrogen sulfide at temperatures of 400°-700° C. according to the equation:

$$TiCl_4 + 2\,H_2S \rightarrow TiS_2 + 4\,HCl \qquad (2)$$

proved to be realizable on a production scale. In this reaction, titanium disulfide can be formed either in the gas phase (cf., for example, U.S. Pat. No. 4,137,297), or on TiS$_2$ that is already present (cf., German OLS 12 24 288), or on the hot reactor wall (cf., German 29 45 306).

In each instance, entry of air is to be avoided because of the formation of oxidic titanium compounds expected a high reaction temperatures.

It is possible to obtain titanium disulfide, which, in principle, is suitable for the manufacture of cathodes for Li/TiS$_2$ batteries, for variations of the above mentioned reaction of titanium tetrachloride with hydrogen sulfide. However, the product obtained thereby requires further improvement in various respects in relation to the previously described criteria which should be met for an ideal TiS$_2$ cathode material.

Thus, the titanium disulfide obtained, for example, as described in U.S. Pat. No. 4,137,297, corresponds to the ideal formula TiS$_2$ with regard to its chemical composition, and its particle size is in the approximately desired range of 1-25μm. However, contamination with free sulfur is clearly too high at 0.54 weight %, and the chlorine content should likewise be lower than the stated value of 0.8 weight %.

In principle, this also applied to the titanium disulfide obtained in accordance with German OLS 29 45 306, which is likewise ideal in a chemical composition; the chlorine content is very low, but the sulfur content at 0.2 weight % is still too high and the particle diameter too large.

Therefore, the critical problems with respect to the titanium disulfides obtained according to the two known processes mentioned above are, on the one hand, the excessively high content of free sulfur and, on the other, the disadvantageous particle size distribution. Heretofore, there were no, or at least no technically simple, solutions to both problems. According to information given in the previously cited book "Speciality Inorganic Chemicals" on page 235, the lubricating properties of titanium disulfide due to the layer structure thereof hinder efficient grinding to regulate the particle size. According to the previous views of battery experts, the crystal structure of $TiS_2$ is also partially destroyed thereby. Consequently, the particle size distribution of crude titanium disulfide has heretofore been regarded by experts as a substantially unalterable parameter. Moreover, grinding of $TiS_2$ with conventional means would be barely possible in technical terms. It would have to be carried out in each case under a protective gas atmosphere because of the extreme tendency of finely divided $TiS_2$ to react with atmospheric oxygen or atmospheric moisture, and to release undesirable sulfur or hydrogen sulfide, as well as a tendency for spontaneous combustibility because of the obvious risk of dust explosion.

A previously developed purification process shown in U.S. Pat. No. 4,307,157 specifies the treatment of crude titanium disulfide with oxidation agents, but is difficult to carry out on an industrial scale and it is very expensive.

Therefore, it is an object of the present invention to provide a technically simple and cost effective process, according to which the titanium disulfide raw material can be prepared, preferably in a single step, that meets the specification enumerated above, for use as electrode material in batteries. In particular, the two major problems, namely, the excessively high sulfur content and the too coarse particle size, can be avoided by means of the process of this invention. That is, it is a feature of the invention to provide a titanium disulfide product suitable for use to make cathodes for batteries wherein the essential process steps are set forth below and no additional purification or special treatments are necessary.

According to the invention, the above object can be achieved by providing titanium disulfide with a composition corresponding to or approximating the stoichiometry of $TiS_2$, with a content of free sulfur greater than 0.1 weight % and/or with a particle diameter $d_{90\%}$ greater than 10μm and dispersing this titanium disulfide in a dispersing machine of the rotor-stator system in a readily volatilizable organic liquid which is inert in relation to $TiS_2$. The organic liquid functions to dissolve, totally or partially, the sulfur contained in the composition but not the $TiS_2$. The titanium disulfide is then separated from the organic liquid. This dispersion treatment can be repeated, as required, using fresh organic liquid. The separated titanium disulfide is thereafter washed with an organic liquid with the same specified properties, and then dried at a temperature ranging from room temperature to 150° C. under a protective atmosphere at or below atmospheric pressure or only in vacuum.

Contrary to previous opinions on the results of dispersion efforts, it has been found that the product obtained by the novel process not only possesses the desired purity with regard to the sulfur and chlorine content and the desired particle size, but, in addition, the electric properties and the crystal structure are not deleteriously affected The titanium disulfide prepared in accordance with the invention thus meets in every respect the requirements enumerated above for electrode material for alkali metal/$TiS_2$ batteries.

Furthermore, the novel treatment of this invention contributes another special property to the obtained product; namely, a substantially increased bulk and. or vibrational density considerably greater than 0.6 g/cm$^3$, versus 0.07–0.4 g/cm$^3$ for the raw material, which considerably facilitates the compaction necessary for electrode construction.

A still further advantage of the treatment of the present invention resides in the reduction of the chlorine content, which, however, is not as important as the reduction of the free sulfur content.

For purposes of comparison, an effort was made to treat $TiS_2$ raw material with ultrasound in a solvent However, comparable product qualities could not be achieved.

The $d_{90\%}$ index for the particle diameter of the starting material designates the maximum diameter of 90% of all particles present. This value can be easily obtained from a curve which shows particle size distribution as percentages The particle size distribution can, for example, be determined with the so-called Coulter counter or with a sedimentation balance.

Typically, the titanium disulfide produced in accordance with the process of this invention has a free sulfur content of less than 0.1% by weight, preferably 0.08% or less and a particle size distribution $d_{90\%}$ smaller than 10μm and greater than 2μm.

Suitable organic media, in which the dispersion treatment can be performed in accordance with the invention, include essentially all organic liquids that volatilize readily under typical drying conditions, that do not react with titanium disulfide, that do not totally dissolve or only partially dissolve titanium disulfide, and in which sulfur is soluble at least to a limited extent.

Thus, for example, carbon disulfide is in principle suitable for this treatment on account of its high sulfur solubilizing ability, but because of its easy combustibility its industrial use is associated with high costs. From the viewpoint of safety, easy separation during drying, and favorable dispersion characteristics of $TiS_2$ in a liquid medium, chlorinated and/or fluorinated hydrocarbons or hydrocarbon mixtures with a boiling point between 20° and 150° C. at standard pressure have proven to be especially suitable. Such organic liquids are solvents such as methylene chloride, chloroform, carbon tetrachloride, 1,2-dichloroethane, 1,2-dichloroethylene, the isomeric compounds of trichloroethane or tetra chloroethane, trichloroethylene, tetrachloroethylene, trichlorofluoromethane, trichlorotrifluoroethane, as well as mixtures thereof. From the viewpoint of toxicity, a broader selection can naturally be made in this case. Methylene chloride is especially preferred in relation to volatility, combustibility, toxicity and availability.

The term "dispersing machine of the rotor-stator system" refers to all grinding systems, which can be used in the liquid phase and consist of at least one rotor rotating at a rate exceeding 1000 rpm and at least one stationary part, the so-called stator (cf., W. Wiedmann and H. Blenke in "Chemie-Anlage+Verfahren", No. 4, 1976, pp. 82–88, 89, 90, 110). These dispersing systems are well known and any suitable system can be used for purposes of the invention.

The various forms of the dispersing machine that can be employed according to the invention, e.g., in a container or in a pipeline, are the state of the art and can also be applied in this case.

The use of certain temperatures and/or pressures is not critical in the novel process of the invention for dispersion treatment of $TiS_2$. Dispersion can be carried out at a temperature below, at, or above room temperature, at standard or excess pressure, which corresponds to the sum of the partial pressures of the volatile components in the suspension. Significant elevation of temperature may occur during treatment of the TiS₂ suspension, which begins at room temperature, with the dispersing machine.

The required duration of treatment of titanium disulfide depends mainly on the starting particle size thereof, the efficiency of the dispersing machine employed (e.g., single- or multistage, rotor-stator diameter, speed or rotation), concentration ratios, and the total amount employed. If a laboratory dispersing machine is used (e.g., so-called Ultra-Turrax made by Janke and Kunkel, Germany) with a rotor-stator diameter of about 4 cm and a rotor rotational speed of 10,000 rpm, a 20-minute treatment, for example, of an amount of about 8 liters of a suspension of 1.5 kg of TiS$_2$ in one of the indicated liquid media suffices to produce electrode suitable material from titanium disulfide with a starting particle size of several mm and with an elevated free sulfur content. The dispersion treatment of the titanium disulfide can naturally be repeated with a fresh organic liquid. To this end, it is best to separate the solvent used in the first dispersion, and to again treat the still moist solid immediately in a suspended state in a fresh solvent with the same or a different composition, but with the necessary properties as explained above. Individual solvents and also mixtures of solvents can be used for the dispersion, provided they have the necessary properties.

The treated solid is separated from the liquid phase according to conventional techniques, such as filtration and/or decanting or centrifugation. Any suitable separation method can be used.

The indicated top limit for the drying temperature of 150° C. can further be raised under certain conditions, e.g., even to 200° C. Titanium disulfide does not decompose substantially even at this higher temperature, for example, in the almost total absence of atmospheric oxygen, if it is subjected to a brief drying. With longer times for high temperature treatments, however, release of free sulfur can occur even in the total absence of air, so that the indicated limit of 0.1 weight % of free sulfur would be exceeded. Further handling of the treated titanium disulfide should proceed in any case only under a protective atmosphere.

A further feature of the present invention resides in the titanium disulfide prepared according to the novel process, which can be used as cathode material in batteries which have an anode of elemental alkali metal, e.g. lithium.

Thus, the titanium disulfide produced in accordance with the present invention is characterized by a free sulfur content of less than 0.1% by weight, preferably 0.08% or less and a partial size distribution d$_{90\%}$ smaller than 10 μm and greater than 2 μm.

The invention will now be described in greater detail with reference to the following examples.

EXAMPLE 1

Titanium disulfide raw material with the following specifications was treated:

| | |
|---|---|
| Ti content: | 42.80 weight % |
| Sulfide content: | 56.30 weight % |
| Free sulfur content: | 0.65 weight % |
| Chlorine content: | 0.58 weight % |
| Particle size distribution: (Coulter counter) | d$_{90\%}$ greater than 10 μm |
| Seebeck coefficient: | 137 μV/K |
| Specific surface (BET): | 3.7 m²/g |
| Bulk density: | 350 g/liter |

1,500 g of this titanium disulfide was suspended in 6.0 liters of methylene chloride under a protective atmosphere. This suspension was treated at room temperature for 30 minutes with a dispersing machine (so-called ULTRA TURRAX machine type T 45, 600 Watt made by Janke & Kunkel GmbH, IKA-Werk, 7813 Staufen, Germany) with a rotor-stator diameter of about 4 cm and a rotor rotational speed of 10,000 rpm. The solid was then filtered through a 10 liter pressure filter under an nitrogen atmosphere, resuspended in 6 liters of methylene chloride, and processed for 30 minutes with the dispersing machine. After repeated filtration, washing with 1 liter of CH$_2$Cl$_2$ and 8 hours of drying at 70° C. under an N$_2$ atmosphere, a battery suitable titanium disulfide with the following specifications was obtained:

| | |
|---|---|
| Ti content: | 42.79 weight % |
| Sulfide content: | 56.38 weight % |
| Free sulfur content: | <0.1 weight % |
| Chlorine content: | 0.49 weight % |
| Particle size distribution: (Coulter counter) | d$_{90\%}$ smaller than 10 μm and greater than 2 μm |
| Seebeck coefficient: | 137 μV/K |
| Specific surface (BET): | 3.7 m²/g |
| Bulk density | 650 g/liter |

EXAMPLE 2

Titanium disulfide raw material with the following specifications was treated:

| | |
|---|---|
| Ti content: | 42.78 weight % |
| Sulfide content: | 56.21 weight % |
| Free sulfur content: | 0.30 weight % |
| Chlorine content: | 0.62 weight % |
| Particle size distribution: (Coulter counter) | d$_{90}$ larger than 10 μm |
| Seebeck coefficient: | 145 μV/K |
| Specific surface (BET): | 4.2 m²/g |
| Bulk density: | 340 g/liter |

1.5 kg of this raw material was treated once under a protective atmosphere for 45 minutes in 6.0 liters of 1,1,1-trichloroethane as in Example 1. After 12 hours of drying at 100° C., a product with the following specifications was obtained:

| | |
|---|---|
| Ti content: | 42.79 weight % |
| Sulfide content: | 56.30 weight % |
| Free sulfur content: | 0.08 weight % |
| Chlorine content: | 0.57 weight % |
| Particle size distribution: (Coulter counter) | d$_{90\%}$ small than 10 μm and greater than 3 μm |
| Seebeck coefficient: | 146 μV/K |
| Specific surface (BET): | 4.2 m²/g |
| Bulk density: | 632 g/liter |

Further variations and modifications of the present invention will be aparent from the foregoing description and are intended to be encompassed by the claims appended hereto.

We claim:

1. A process for preparing titanium disulfide for use as electrode material in batteries, comprising providing titanium disulfide with a composition corresponding to or approximating the stoichiometry of $TiS_2$, with a content of free sulfur greater than 0.1 weight % and/or with a particle diameter $d_{90\%}$ greater than 10 µm, dispersing said disulfide in a dispersing machine of the rotor-stator system in a readily volatilizable organic liquid which is inert in relation to $TiS_2$, and which solvent dissolves totally or partially the sulfur but not $TiS_2$, separating solid from the liquid phase, washing the separated solid titanium disulfide with an organic liquid that is inert with respect to the $TiS_2$, drying the titanium disulfide at a temperature ranging from room temperature to 150° C.

2. The process according to claim 1 wherein the disulfide is repeatably dispersed in fresh organic liquid.

3. The process according to claim 1 wherein the drying takes place under a protective atmosphere.

4. The process according to claim 3 wherein the atmosphere is below atmospheric pressure.

5. The process according to claim 3 wherein the drying is conducted in vacuum.

6. The process according to claim 1, wherein the dispersion is carried out in a chlorinated or fluorinated hydrocarbon or mixtures thereof with a boiling point of 20°-150° C. at standard pressure.

7. The process according to claim 1 wherein the dispersion is carried out in methylene chloride.

8. The process according to claim 1 wherein the dispersion is carried out in dispersing means operating at a rate exceeding 1,000 rpm.

9. The process according to claim 1, wherein said dispersing machine contains at least one rotor rotating at a rate exceeding 1000 rpm.

10. The process according to claim 1, wherein the dispersing is carried out for a sufficient period of time and at a sufficient dispersing rate to produce the titanium disulfide having a free sulfur content of less than 0.1% by weight and a particle size distribution $d_{90\%}$ smaller than 10 µm.

11. The process according to claim 1, wherein the solvent consists essentially of a readily volatilizable organic liquid inert to $TiS_2$ and capable of at least partially dissolving the sulfur impurities but not $TiS_2$.

* * * * *